(12) United States Patent
Hansson

(10) Patent No.: US 7,013,773 B2
(45) Date of Patent: Mar. 21, 2006

(54) TOOL HOLDER FOR CARRYING MULTIPLE TOOL HEADS SIMULTANEOUSLY

(75) Inventor: Per Hansson, Gävle (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/315,074

(22) Filed: Dec. 10, 2002

(65) Prior Publication Data

US 2003/0129024 A1    Jul. 10, 2003

(30) Foreign Application Priority Data

Dec. 10, 2001    (SE) .................................... 0104130

(51) Int. Cl.
   *B23B 21/00* (2006.01)
(52) U.S. Cl. ................ 82/137; 82/159; 29/53
(58) Field of Classification Search ............... 29/27 C, 29/40, 55, 53; 82/137, 127, 159, 158, 138
   See application file for complete search history.

(56) References Cited

U.S. PATENT DOCUMENTS

| | | | |
|---|---|---|---|
| 2,685,122 A | 8/1954 | Berthiez | |
| 2,697,611 A | * 12/1954 | Glasser | ........................... 279/6 |
| 3,901,613 A | 8/1975 | Andersson | |
| 4,058,034 A | 11/1977 | Lahm et al. | |
| 5,791,032 A | * 8/1998 | Spencer et al. | .......... 29/48.5 A |
| 6,128,812 A | 10/2000 | Link et al. | |
| 6,146,060 A | 11/2000 | Rydberg et al. | |
| 6,230,595 B1 | 5/2001 | Kranjac | |
| 6,244,780 B1 | 6/2001 | Hansson | |
| 2002/0170396 A1 | 11/2002 | Maier | |

FOREIGN PATENT DOCUMENTS

| | | | |
|---|---|---|---|
| GB | 2073063 A | * 10/1981 | |
| WO | WO 01/64377 | 9/2001 | |

* cited by examiner

*Primary Examiner*—Willmon Fridie, Jr.
(74) *Attorney, Agent, or Firm*—Drinker Biddle & Reath LLP

(57) ABSTRACT

A tool holder simultaneously carries at least two diametrically arranged tool heads, each tool head carrying cutting inserts for chip removing machining. The tool holder includes an adaptor connected to a coupling. The adaptor has at least two diametrically opposite side surfaces which diverge away from the coupling. The side surfaces have seats in order to replaceably receive respective tool heads. A line which lies in both a first basal plane and in one of the side surfaces forms an angle in the interval 1°–15° with a longitudinal center line of the tool holder.

13 Claims, 8 Drawing Sheets

US 7,013,773 B2

TOOL HOLDER FOR CARRYING MULTIPLE TOOL HEADS SIMULTANEOUSLY

This application claims priority under 35 U.S.C. § 119 to patent application Ser. No. 0104130-0 filed in Sweden on Dec. 10, 2001, the entire content of which is hereby incorporated by reference.

TECHNICAL FIELD OF THE INVENTION

The present invention relates to a tool holder, which is intended to simultaneously carry at least two diametrically arranged tool heads, which carry respective cutting inserts for chip removing machining, the tool holder comprising an adaptor and a coupling. The invention also relates separately to an adaptor included in the tool holder.

PRIOR ART

An embodiment of a tool holder which has three serrated surfaces, two of which are preferably parallel to each other and the third surface having an extension perpendicular to the two parallel surfaces holder is previously known from Hansson U.S. Pat. No. 6,244,780. All of said three surfaces have members for receipt of a tool head, said members in this case consisting of holes, in which a drawbar of the tool head is intended to be received. The tool holder according to U.S. Pat. No. 6,244,780 is not intended to carry a plurality of tool heads simultaneously.

OBJECTS AND FEATURES OF THE INVENTION

A primary object of the present invention is to provide a tool holder of the kind defined in the introduction and which simultaneously can carry at least two substantially diametrically arranged replaceable tool heads.

Another object is to provide tool heads arranged in a way which ensures that they do not interfere with the workpiece when chip removing machining is carried out with any one of the tool heads.

Another object of the present invention is to ensure that the tool holder should preferably carry a relatively large number of replaceable tool heads, whereby switching between different tool heads can be effected exceptionally quickly.

Yet another object of the present invention is to provide an exceptionally exact positioning of the replaceable tool heads on the tool holder.

At least the primary object is realized by means of a tool holder for simultaneously carrying at least two chip-removing tool heads. The tool holder comprises a coupling which defines an axis of rotation, and an adapter mounted on the coupling to be driven thereby. The adapter includes at least one pair of side surfaces arranged diametrically opposite one another with respect to the axis and facing away from one another. The pair of side surfaces diverge from one another in a direction away from the coupling. Each of the side surfaces of the pair includes a seat configured to replaceably receive a tool head. The pair of surfaces are bisected by an imaginary basal plane, wherein a line lying in both the basal plane and either of the pair of side surfaces forms with the axis an angle of inclination in the range of 1–15°.

The invention also pertains to the adapter per se.

BRIEF DESCRIPTION OF THE DRAWINGS

Embodiments of the invention will be described below, reference being made to the accompanying drawings, where.

DESCRIPTION OF PREFERRED EMBODIMENTS OF THE INVENTION

Figure 1:
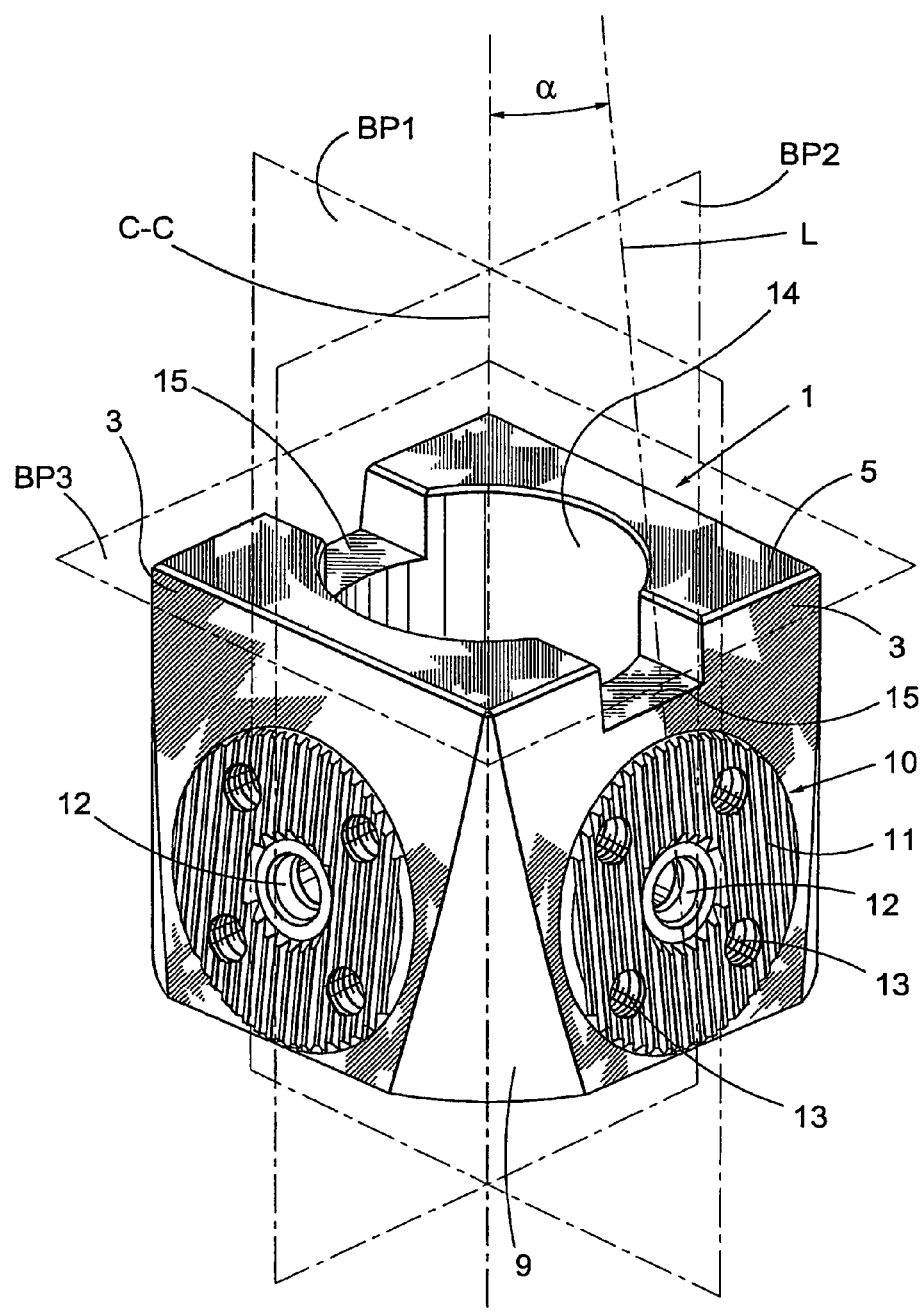
FIG. 1 shows a perspective view of a first embodiment of an adaptor that is included in the tool holder according to the present invention.
Figure 2:
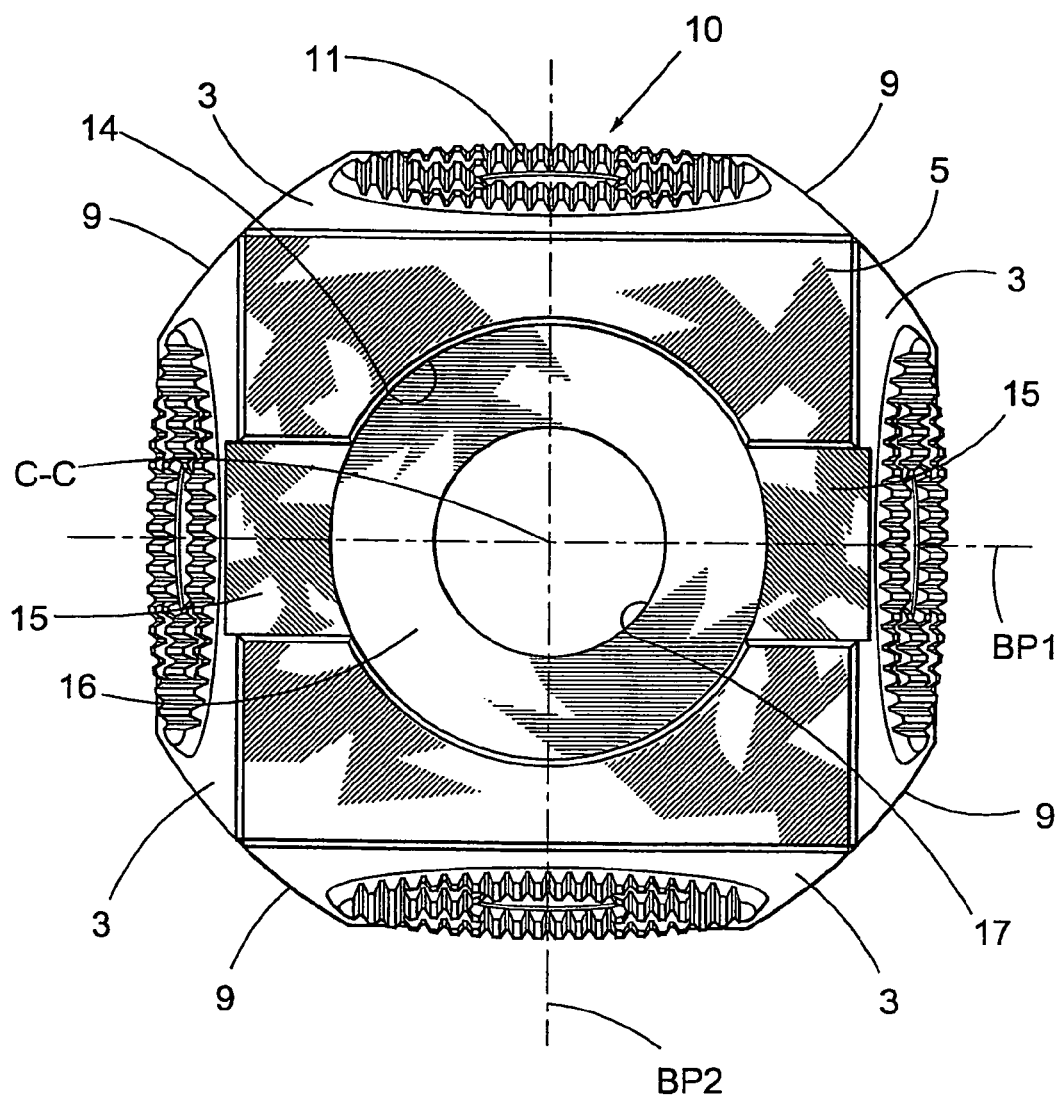
FIG. 2 shows a planar view from above of the adaptor according to FIG. 1.
Figure 3:
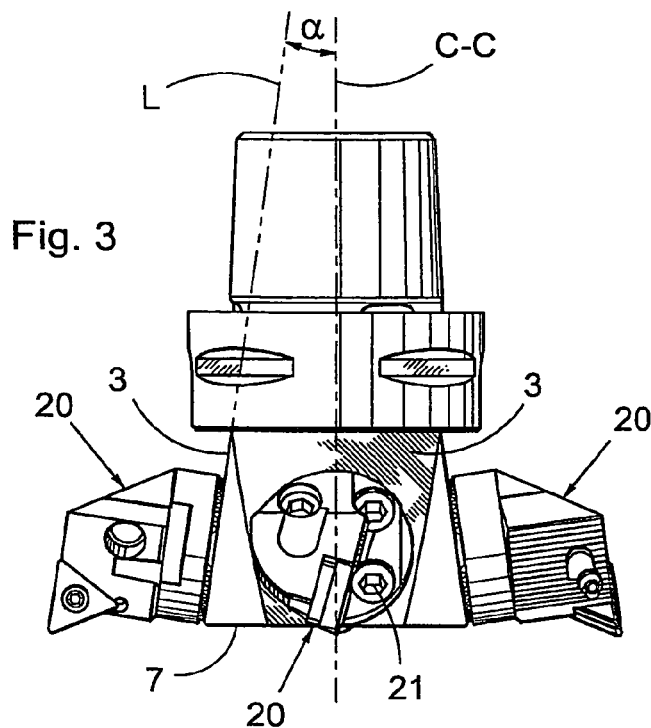
FIG. 3 shows a side view of a tool holder according to the present invention, which is equipped with a number of replaceable tool heads.

The adaptor 1 illustrated in FIGS. 1 and 2 comprises four side surfaces 3, a contact surface 5 as well as affront surface 7, see FIG. 3, which is parallel to the contact surface 5. Generally triangular, bridging surfaces 9 are arranged between adjacent side surfaces 3, which bridging surfaces are somewhat curved and positioned in the neighborhood of the corners of the adaptor 1.

Each of the side surfaces 3 has a mounting area or seat member 10, which in the embodiment illustrated is circular and provided with ridged teeth 11. A first center hole 12 as well as four threaded anchor holes 13 are arranged in the mounting area 10, and they are all arranged symmetrically around the center hole 12, which is intended for the supply of cooling medium.

A preferred connection structure comprised of a circular cylindrical recess 14 as well as a groove 15 is arranged in the contact surface 5, which surface is intended to come to abutment against a co-operating surface in a coupling. The circular cylindrical recess 14 has an extension from the contact surface 5 in the direction of the front surface 7. The recess 14 has certain depth due to the fact that the inner end thereof is defined by a step 16, which has a radial extension in respect to a longitudinal center line C—C of the recess 14. The center line defines an axis of rotation. A second center hole 17 which is a through-hole extends from the step 16 and penetrates the front surface 7.

The groove 15 penetrates two opposite side surfaces 3 and is centered with respect to said opposite side surfaces 3.

Figure 4:
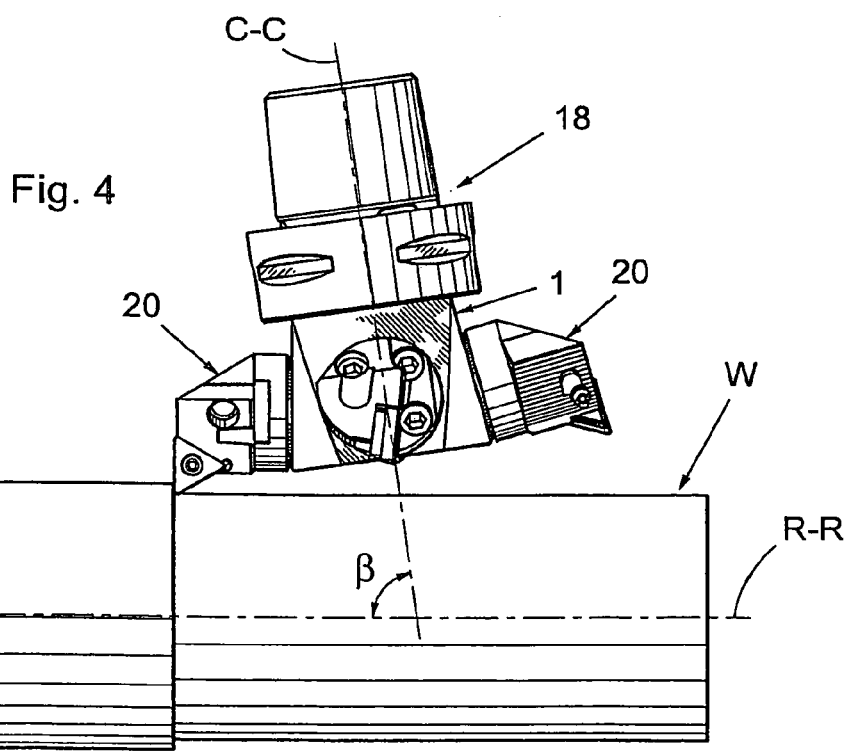
FIG. 4 shows a side view of the tool holder equipped with a number of replaceable tool heads according to FIG. 3 during chip forming machining of a rotating work-piece, the axis of rotation of the workpiece being in the plane of the paper.
Figure 5:
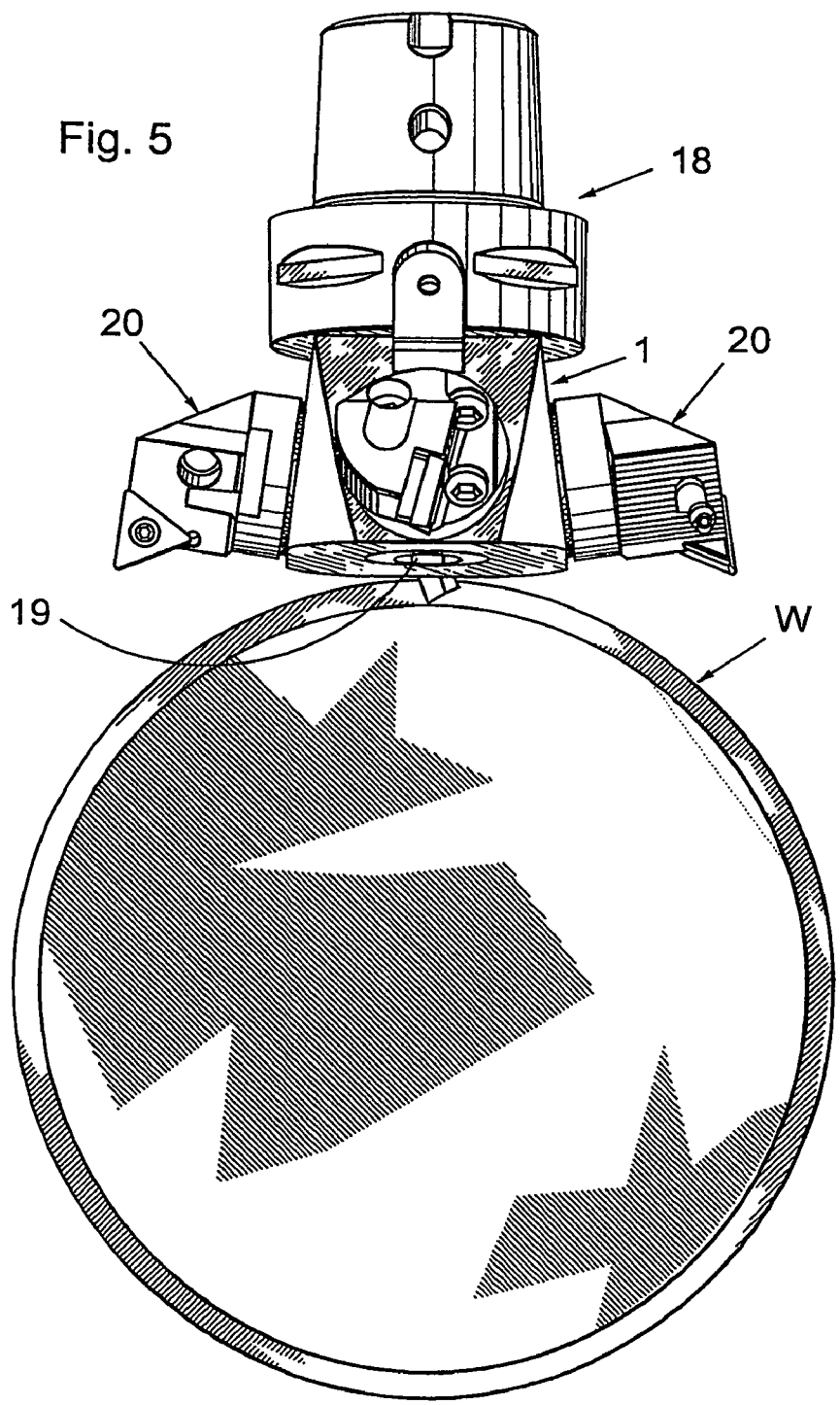
FIG. 5 shows a view, somewhat in perspective, of the tool holder according to the present invention during chip forming machining of the workpiece illustrated in FIG. 4, the axis of rotation of the workpiece extending perpendicularly to the plane of the paper.

In order to facilitate the description of the mutual orientation of the surfaces of the adaptor 1 as well as the relevant parts of the replaceable tool heads, see FIGS. 3–5, which are intended to be brought into contact with the adaptor 1, a number of imaginary basal planes are inserted in FIGS. 1–5. A first basal plane BP1 contains the center line C—C, which is situated at the center of the groove 15 and divides the adaptor 1 into two equally large, mirror-inverted halves. A second basal plane BP2 also contains the center line C—C as well as having an extension perpendicular to the first basal plane BP1, i.e. the second basal plane BP2 also divides the adaptor I into two equally large, mirror-inverted halves. A third basal plane BP3 contains the contact surface 5, i.e. the third basal plane BP3 is perpendicular to the center line C—C and has an extension parallel to the plane of the paper in FIG. 2.

Opposite ones of the side surfaces 3 are not parallel to each other but rather diverge from each other in a direction from the contact surface 5 towards the front surface 7. A line L, which is situated in the first basal plane BP1 and in one of the opposite side surfaces 3 which is bisected by the plane BP1 (i.e., the side surfaces that are penetrated by the groove 15), forms an angle a to the center line C—C, wherein $1°<\alpha<15°$ and preferably $2.5°<\alpha<7.5°$. The line L is shown in FIG. 3 where the first basal plane BP1 is parallel to the plane of the paper. The other side surfaces 3 of the adaptor 1 have the same inclination in relation to the center line C—C.

The adaptor 1 is connected, as shown in FIGS. 3–5, to coupling 18, whereby the tool holder according to the present invention is obtained. The coupling 18 has a male part (not shown) that is received in the recess 14. An anchor bolt 19 extends through the second center hole 17 and into a threaded hole on the male part, whereby the contact surface 5 is brought into contact with a co-operating surface of the coupling 18. The coupling 18 is also provided with driver members 20, which are received in the grooves 15 in order to provide a joint suitable for the rotation between the adaptor 1 and the coupling 18. The center line C—C also constitutes a center line for the coupling 18, and thereby also for the tool holder according to the present invention.

Replaceable tool heads 20, which may be of standard type (since the mounting areas 10 have been formed to co-operate with standard tool heads), are applied on the mounting area 10 of the adaptor 1. The replaceable tool heads 20 are anchored on the mounting areas 10 by means of a screw joint, i.e. screws 21 extend into the anchor holes 13. Ridged teeth, which cooperate with the ridged teeth 11 arranged on the mounting surface 10, are arranged on the surface of each of the tool heads 20 that is intended to cooperate with the appurtenant mounting surface 10. Thereby, an exceptionally inelastic anchorage of the tool heads 20 on the adaptor is obtained.

FIGS. 4 and 5 show how the tool holder according to the present invention is oriented when a tool head performs chip-removing machining on the rotating workpiece W. In that connection, the center axis C—C of the tool holder does not form a right angle to the rotation axis R—R of the workpiece W, but rather the angle β is formed which is smaller than 90°. This means that the tool head 20 that is opposite the active tool head 20 is distanced a certain distance from the workpiece W. That is the result of the fact that the active tool head should have a certain orientation in relation to the workpiece W and that the side surfaces 3 of the adaptor 1 have the above-described inclination. By studying FIGS. 4 and 5, it is realized that the tool holder according to the present invention can be indexed in a simple way, i.e., be rotated around the center line C—C, wherein another tool head 20 becomes active. In this connection, it should be pointed out that the indexing can be effected without the angle β having to be changed.

Figure 6:
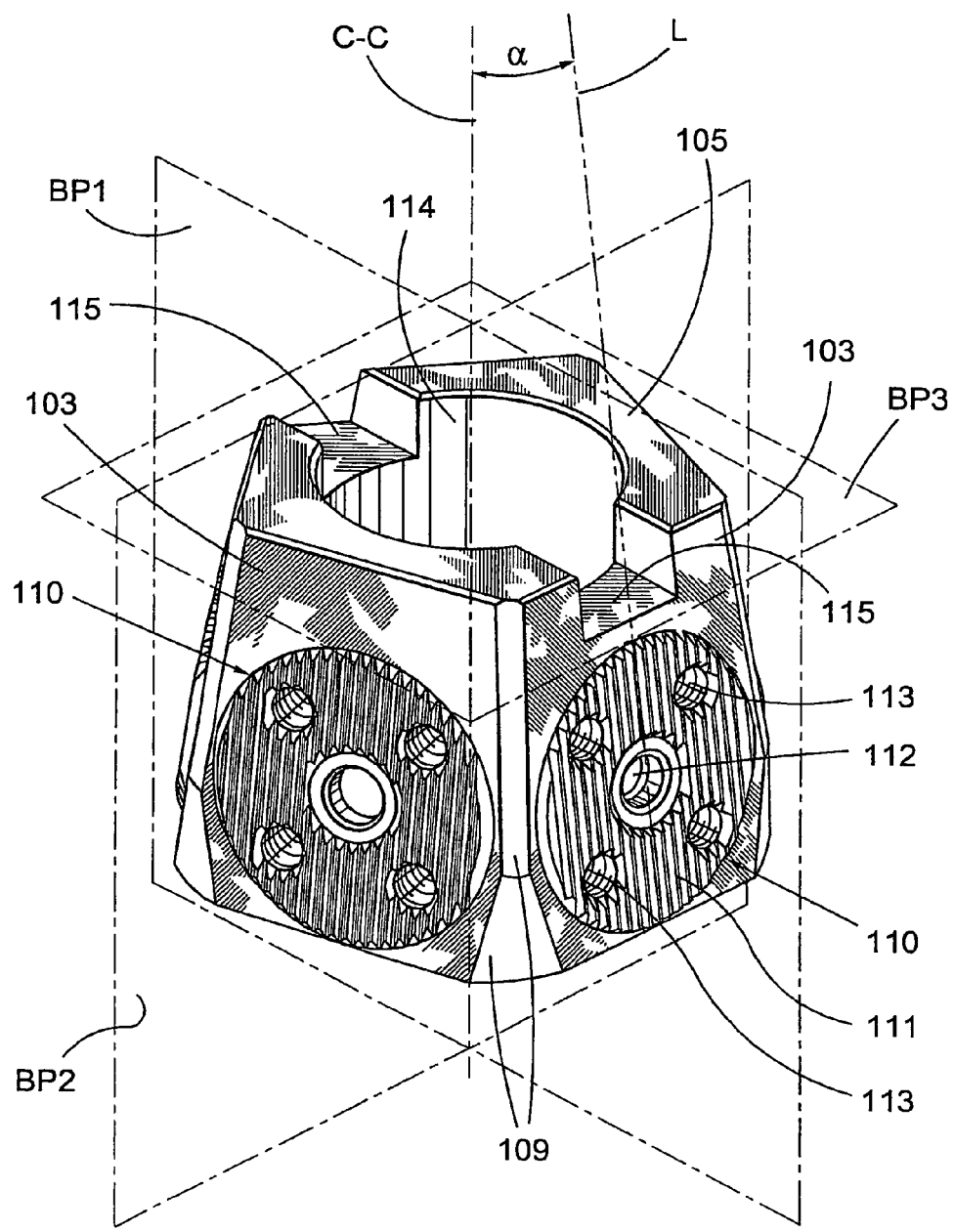
FIG. 6 shows a perspective view of a second embodiment of an adaptor that is included in the tool holder according to the present invention.
Figure 7:
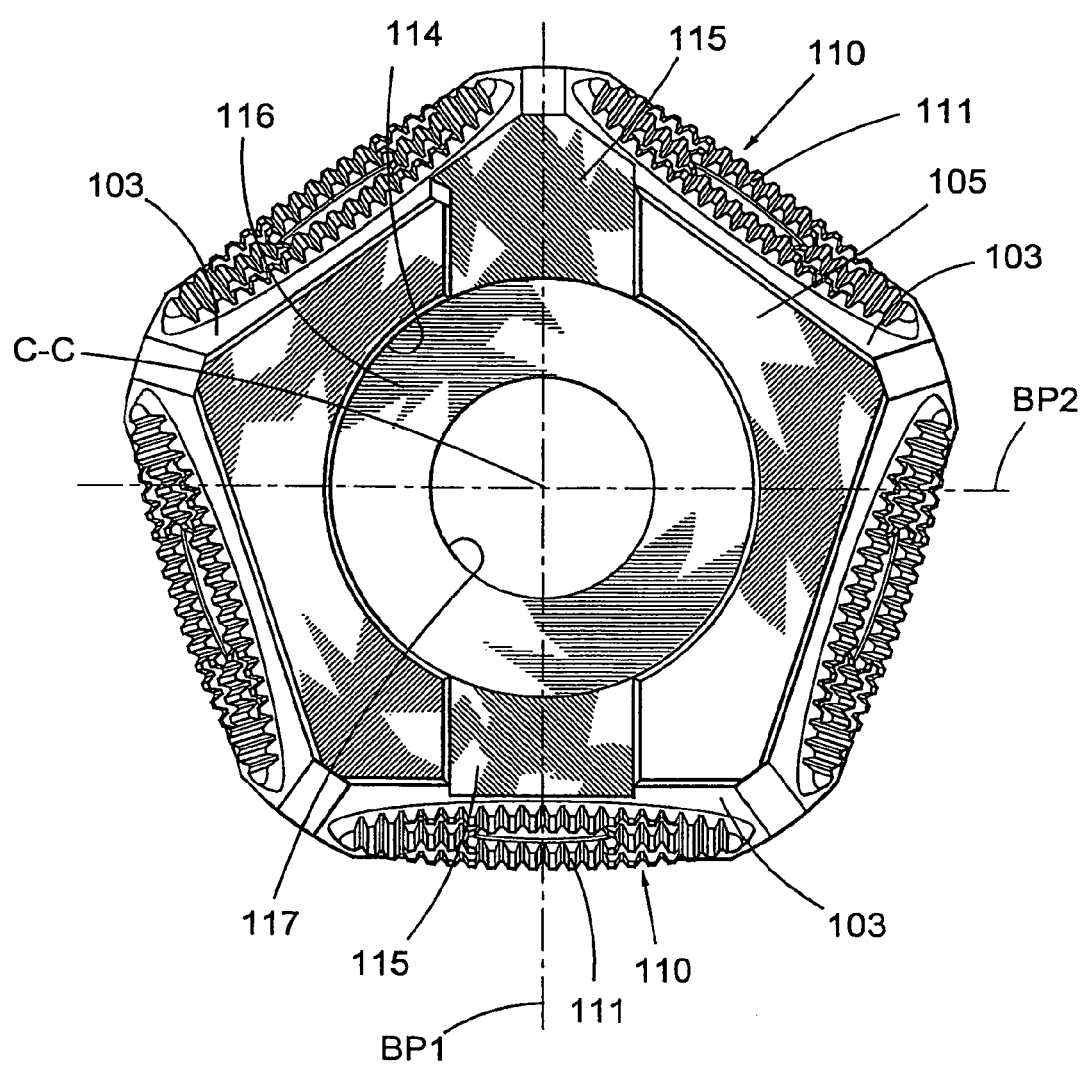
FIG. 7 shows a planar view of the adaptor according to FIG. 6.

An alternative embodiment of an adaptor 101 according to the present invention is shown in FIGS. 6 and 7. As can be seen in FIGS. 6 and 7, the adaptor 101 has five side surfaces 103, a contact surface 105 and a front surface (not shown), which is parallel to the contact surface 105. Between adjacent side surfaces 103, bridging surfaces 109 are arranged, which are composed of generally triangular and rectangular portions as well as being situated in the area of the corner of the adaptor 101.

Each one of the side surfaces 103 has a mounting area 110, which in principle is identical to the mounting area 10 of the embodiment according to FIGS. 1–2, i.e., it is circular and provided with ridged teeth 111. A first center hole 112, as well as four threaded anchor holes 113 which are arranged symmetrically around the center hole 112, are arranged in the mounting area 110.

A circular cylindrical recess 114 as well as a groove 115, which is intended to come to abutment against a cooperating surface in a coupling, are arranged in the contact surface 105. The circular cylindrical recess 114 has an extension from the contact surface 105 in the direction of the front surface, the recess 114 having a certain depth due to the fact that the inner end thereof is defined by a step 116, which has a radial extension in respect to a longitudinal center line C—C for the recess 114. A second center hole 117, which is a through-hole, extends from the step 116 and penetrates the front surface.

Three basal planes BPI, BP2 and BP3 are indicated in FIGS. 6 and 7, in the same way as in FIGS. 1 and 2. The first basal plane BP1 divides the adaptor 101 into two equally large, mirror-inverted halves. The second basal plane BP2 divides the adaptor 101 into two halves that are not mirror-inverted. The third basal plane BP3 contains the contact surface 105 and is parallel to the plane of the paper in FIG. 7.

Figure 8:
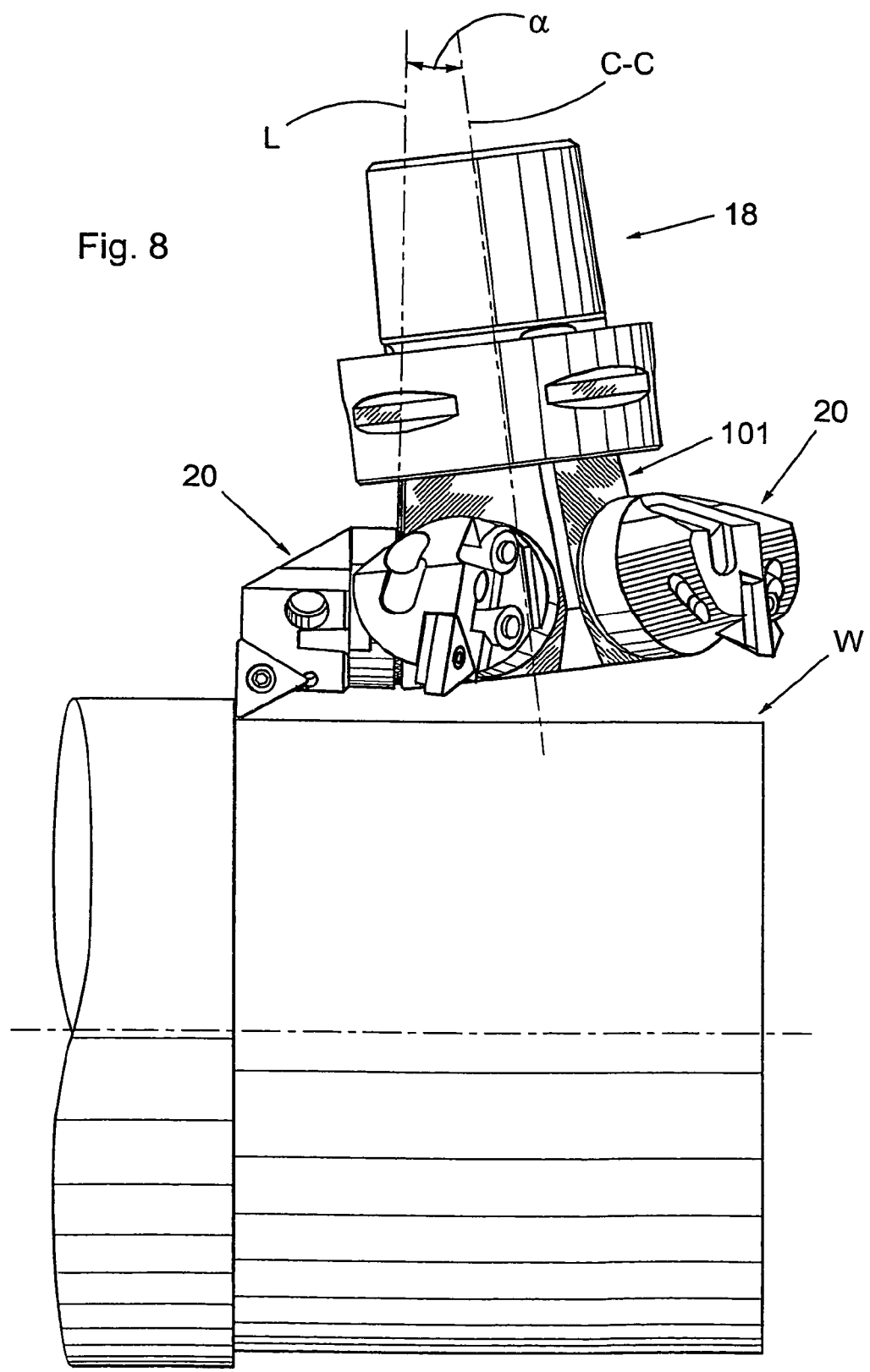
FIG. 8 shows a side view of a tool holder according to the present invention equipped with replaceable tool heads, in which tool holder the adaptor according to FIGS. 6 and 7 is included, a tool head of the tool holder performing chip removing machining of a rotating workpiece, where the axis of rotation of the workpiece is in the plane of the paper.

The side surfaces 103 diverge from the center line C—C as those surfaces extend away from the contact surface 105 towards the front surface. Conversely, those surfaces converge toward an imaginary point of intersection spaced axially rearwardly of the axial front end of the adapter. A line L which is situated in the first basal plane BPI and also in one of the side surfaces 103 penetrated by the groove 115, forms an angle a with the center line C—C, wherein $1° <\alpha< <15°$ and preferably $2.5°<\alpha<7.5°$. The line L is shown in FIGS. 6 and 8. In FIG. 8 the first basal plane BP1 is parallel to the plane of the paper. The other side surfaces 103 of the adaptor 101 have the same inclination in relation to the center line C—C.

Figure 9:
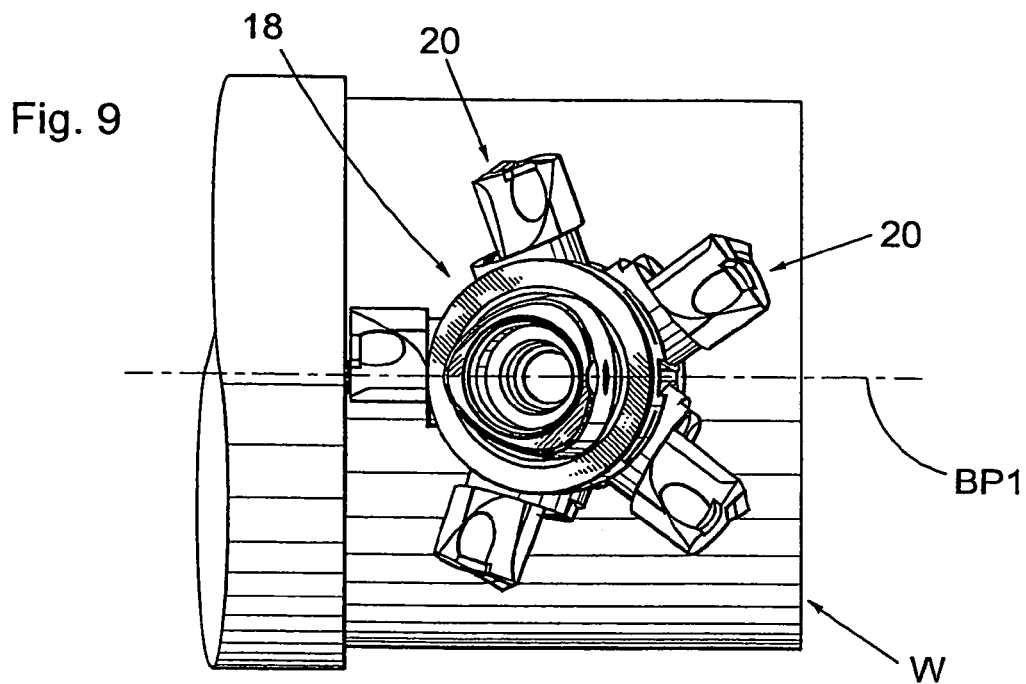
FIG. 9 shows a view from above, somewhat in perspective, of the tool holder equipped according to FIG. 8, a tool head of the tool holder performing chip removing machining of a rotating workpiece, where the axis of rotation of the workpiece is in the plane of the paper.

The tool holder according to the present invention is shown in FIGS. 8 and 9, the tool holder comprising the adaptor 101 and a coupling 18 which may be identical with the coupling 18 according to FIGS. 4–5. The tool holder is equipped with five tool heads 20, which thus may be identical with the tool heads 20 shown in FIGS. 3–5 and preferably are of a standard conventional type. The maximum number of tool heads 20 equals the number of side surfaces 103. As is seen especially clearly in FIG. 9, the tool heads 20 are not directly opposite each other. However, it is necessary that the two tool heads 20 which are situated on opposite side of the adaptor 101, in comparison with the active tool head 20, are distanced from the workpiece W since they would otherwise interfere with said workpiece W.

Figure 10:
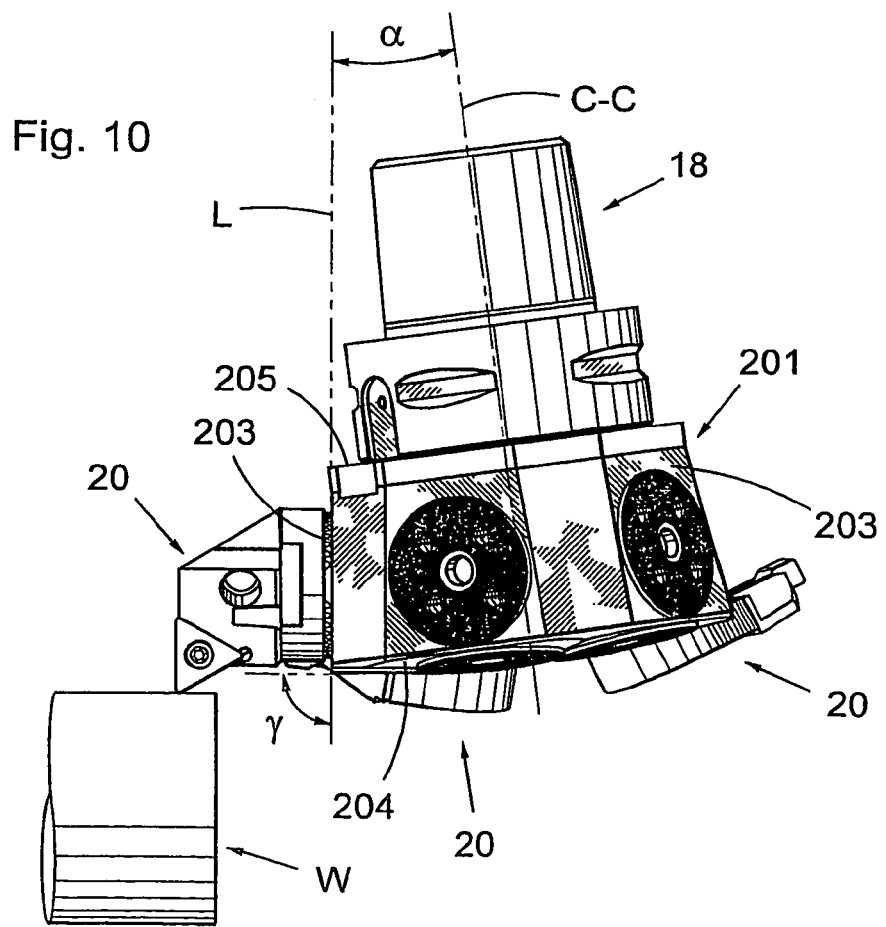
FIG. 10 shows a schematic side view of additionally one alternative embodiment of the tool holder according to the present invention, which tool holder is equipped with a number of tool heads.

The embodiment illustrated in FIG. 10 comprises an adaptor 201 which is "double-conical". That is, in addition to the first side surfaces 203 which diverge in a direction away from the contact surface 205 towards the adaptor 201, the adapter also comprises second side surfaces 204, which converge very sharply in a direction away from the contact surface 205 (i.e., the surfaces 204 face generally downward in FIG. 10). A line L that is parallel to the plane of the paper in FIG. 10 and is situated in a first side surface 203, is inclined at a corresponding angle α in relation to the center line C—C as in the above-described embodiments, i.e., $1°<\alpha<15°$. In that connection, a first basal plane, corresponding to the earlier described first basal plane BP1, is parallel to the plane of the paper in FIG. 10, said basal plane dividing the appurtenant first side surface 203 exactly in two halves. As for the inclination of the second side surfaces 204, the angle γ which is contained between intersecting first and second side surfaces 203, 204 is in the interval 70°–90°. In the embodiment according to FIG. 10, the number of first and second side surfaces 203, 204 may vary according to what is said below under the heading "Feasible Modifications of the Invention", wherein, however, the number of first side surfaces 203 should be equal to the number of second side surfaces 204. As is shown in FIG. 10, both the first side surfaces 203 and the second side surfaces 204 may be equipped with tool heads 20, preferably of a conventional type.

Feasible Modifications of the Invention

In the embodiments illustrated above, the adaptor 1; 101 is provided with four and five side surfaces 3; and 103, respectively. However, within the scope of the present invention, it is also conceivable that the adaptor could be provided with two diametrically opposite side surfaces or more than five side surfaces. The fact that the case where the adaptor is provided with three side surfaces has been excluded from this description is due to the fact that the inactive tool heads in such a case normally do not interfere with the workpiece.

In the above-described embodiments, the adaptor 1; 101 and the coupling 18 constitute two separate units that are connected in a suitable way. Within the scope of the present invention, it is also conceivable that the adaptor and the coupling could be integrated into one unit.

In the above-described embodiments, all side surfaces 3; 103 have the same inclination in relation to the center line C—C. However, it is conceivable within the scope of the present invention that the side surfaces 3; 103 could have different respective inclinations in relation to the center line C—C. With an exemplifying and not limiting aim, it is conceivable that a side surface could have a deviating inclination while the rest of the side surfaces have the same inclination relative to the center line C—C. Alternatively, it is conceivable that all side surfaces have different inclinations relative to the center line C—C. In case the side surfaces have different inclinations, the angle β in, for instance, FIG. 4 has to be changed when the tool holder is indexed.

In the above-described embodiments, the mounting areas 10; 110 are provided with ridged teeth 11; 111 and anchor holes 13; 113 for a satisfactory mounting of the tool heads 20 on the adaptor 1; 101; 201. However, alternative mounting expedients are conceivable within the scope of the present invention that enable mounting of tool heads on an adaptor. With an exemplifying but not limiting aim, as alternatives to the mounting members illustrated in the above-described embodiments, splines, different types of cones, drawbars and center bolts may be mentioned.

Although the present invention has been described in connection with preferred embodiments thereof, it will be appreciated by those skilled in the art that additions, deletions, modification, and substitutions not specifically described may be made without departing from the spirit and scope of the invention as defined in the appended claims.

What is claimed is:

1. A tool holder for simultaneously carrying at least two chip-removing tool heads, comprising:
   a coupling defining an axis of rotation; and
   an adapter including axially spaced front and rear ends, the rear end mounted on the coupling to be driven thereby, the adapter including at least one pair of side surfaces arranged generally diametrically opposite one another with respect to the axis and facing away from one another, the pair of side surfaces converging toward an imaginary point of intersection spaced axially rearwardly of the axial front end of the adapter, each of the side surfaces of the pair including a seat configured to replaceably receive a tool head, the pair of surfaces being bisected by an imaginary basal plane, wherein a line lying in both the basal plane and either of the pair of side surfaces forms with the axis an angle of inclination in the range of 1–15 degrees.

2. The tool holder according to claim 1 wherein the angles of inclination of the respective side surfaces are identical.

3. The tool holder according to claim 1 wherein the angle of inclination is in the range 2.5 to 7.5 degrees.

4. The tool holder according to claim 1 wherein the adapter is detachably connected to the coupling.

5. The tool holder according to claim 1 wherein the adapter is integral with the coupling.

6. The tool holder according to claim 1 wherein each seat comprises teeth in the form of parallel ridges.

7. The tool holder according to claim 1 wherein the adapter comprises more than one pair of opposing side surfaces.

8. The tool holder according to claim 1 wherein the adapter includes a through-hole extending along the axis.

9. An adapter for simultaneously carrying at least two chip-removing tool heads, comprising a body defining a center axis, the body including axially spaced front and rear ends and at least one pair of side surfaces arranged diametrically opposite one another and facing away from one another, the rear end defined by a contact surface including a connection structure adapted to connect to a coupling; the pair of side surfaces converging toward an imaginary point of intersection spaced axially rearwardly of the axial front end, each of the side surfaces including a seat configured to replaceably receive a tool head, the pair of surfaces being bisected by an imaginary basal plane, wherein a line lying in both the basal plane and either of the pair of side surfaces forming with the axis an angle of inclination in the range of 1–15 degrees.

10. The adapter according to claim 9 wherein the angles of inclination of the side surfaces are equal.

11. The adapter according to claim 9 wherein the angle of inclination is in the range of 2.5 to 7.5 degrees.

12. The adapter according to claim 9 wherein the body includes a through-hole extending along the axis.

13. The adapter according to claim 9 wherein each seat comprises teeth in the form of parallel ridges.

\* \* \* \* \*